US012703245B2

(12) United States Patent
Shah et al.

(10) Patent No.: US 12,703,245 B2
(45) Date of Patent: Aug. 11, 2026

(54) SYSTEM AND METHOD FOR MANAGING POWER SUPPLIED TO A TRANSPORTATION REFRIGERATION UNIT (TRU)

(71) Applicant: Carrier Corporation, Palm Beach, FL (US)

(72) Inventors: Vaibhav Shah, Indore (IN); Satyanjay Sahoo, Pune (IN); Venkata Satya Sai Ramesh Kumar Junnuri, Hyderabad (IN); Liujia Dong, Dallas, TX (US); Subbarao Varigonda, Carmel, IN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 25 days.

(21) Appl. No.: 18/942,734

(22) Filed: Nov. 10, 2024

(65) Prior Publication Data

US 2025/0162420 A1 May 22, 2025

Related U.S. Application Data

(60) Provisional application No. 63/599,771, filed on Nov. 16, 2023.

(51) Int. Cl.
*B60L 1/00* (2006.01)
*B60H 1/00* (2006.01)
(Continued)

(52) U.S. Cl.
CPC .......... *B60L 1/003* (2013.01); *B60H 1/00428* (2013.01); *B60L 50/75* (2019.02);
(Continued)

(58) Field of Classification Search
CPC .......... B60L 1/003; B60L 50/75; B60L 58/40; B60L 2200/36; B60L 2210/14;
(Continued)

(56) References Cited

U.S. PATENT DOCUMENTS 7,730,981 B2 6/2010 McCabe et al.
7,831,343 B2 11/2010 Formanski et al.
(Continued)

FOREIGN PATENT DOCUMENTS

AU 2011259799 B2 7/2013
JP 2003324853 A 11/2003
(Continued)

OTHER PUBLICATIONS

Extended European Search Report received for EP Application No. 24213256.1, mailed on May 7, 2025, 13 Pages.

*Primary Examiner* — Anne Marie Antonucci
*Assistant Examiner* — Luis G Del Valle
(74) *Attorney, Agent, or Firm* — Souad Hakim

(57) ABSTRACT

A system for managing power supplied to a Transportation Refrigeration Unit (TRU), includes a power supply system, at least one electric power converter, and control circuitry coupled to the power supply system and the TRU. The power supply system includes a battery unit and a fuel cell connected in parallel. The control circuitry is configured to receive information associated with an operational characteristic of a subcomponent of the TRU and predict an increase or a decrease in a load associated with the subcomponent of the TRU based on the received information. Consequently, the control circuitry broadcasts a control signal to the fuel cell at a predefined time duration before the predicted increase or decrease in the load such that the control signal regulates the power supply from the fuel cell to the subcomponent.

16 Claims, 4 Drawing Sheets

(51) Int. Cl.
*B60L 50/75* (2019.01)
*B60L 58/40* (2019.01)
*B60R 16/023* (2006.01)

(52) U.S. Cl.
CPC ............ *B60L 58/40* (2019.02); *B60R 16/023* (2013.01); *B60L 2200/36* (2013.01); *B60L 2210/14* (2013.01); *B60L 2210/40* (2013.01); *B60L 2240/80* (2013.01)

(58) Field of Classification Search
CPC .. B60L 2210/40; B60L 2240/80; B60L 58/31; B60L 2240/421; B60L 2240/429; B60L 2260/44; B60L 2260/54; B60L 1/08; B60H 1/00428; B60H 1/00014; B60H 1/3232; B60H 2001/3292; B60H 2001/3294; B60R 16/023; F25D 11/003
See application file for complete search history.

(56) References Cited

U.S. PATENT DOCUMENTS

| | | | |
|---|---|---|---|
| 7,835,831 B2 | 11/2010 | Chung et al. | |
| 8,138,720 B2 | 3/2012 | Snyder et al. | |
| 8,374,740 B2 | 2/2013 | Druenert et al. | |
| 9,054,385 B2 | 6/2015 | Jones et al. | |
| 2004/0013920 A1 | 1/2004 | Hasuka et al. | |
| 2005/0139399 A1 | 6/2005 | Gopal | |
| 2007/0046250 A1 | 3/2007 | Freiman et al. | |
| 2009/0223726 A1 | 9/2009 | Jeon et al. | |
| 2011/0071707 A1 | 3/2011 | Crumm et al. | |
| 2011/0093223 A1 | 4/2011 | Quet | |
| 2012/0025619 A1 | 2/2012 | Lienkamp et al. | |
| 2014/0277931 A1 | 9/2014 | Crowe | |
| 2016/0375777 A1* | 12/2016 | Kwon | B60L 50/51 307/10.1 |
| 2018/0001739 A1* | 1/2018 | Vehr | F25D 29/003 |
| 2019/0277647 A1* | 9/2019 | Adetola | B60H 1/3232 |
| 2021/0188130 A1 | 6/2021 | Kunzwa | |
| 2021/0197645 A1 | 7/2021 | Larson et al. | |
| 2023/0278512 A1 | 9/2023 | She et al. | |

FOREIGN PATENT DOCUMENTS

| | | |
|---|---|---|
| JP | 4614182 B2 | 1/2011 |
| WO | 2011019133 A2 | 2/2011 |

* cited by examiner

SYSTEM AND METHOD FOR MANAGING POWER SUPPLIED TO A TRANSPORTATION REFRIGERATION UNIT (TRU)

CROSS REFERENCE TO RELATED APPLICATION

This application claims the benefit of U.S. Provisional Patent Application No. 63/599,771 filed on Nov. 16, 2023, which is incorporated by reference herein in its entirety.

FIELD OF THE INVENTION

The disclosure relates to vehicles having a Transport Refrigeration Unit (TRU), and more specifically to a power system for such a vehicle and a method for controlling power supply to an energy storage unit of the power system.

BACKGROUND

Vehicles, such as Light Commercial Vehicles (LCVs) or Heavy Commercial Vehicles, are generally deployed for transporting cargo via sea, rail, or road networks. Such vehicles usually include a cargo container for storing cargo to be transported. To maintain the quality of the goods in the cargo container, a refrigeration unit may be deployed to such cargo container of the vehicle. Typically, the refrigeration unit provides desired environmental parameters, such as temperature, pressure, humidity, and other conditions to the cargo container. Such refrigeration unit is either powered by an electric power source, a fuel-based power source, or a combination thereof. Further, the fuel-based power source is usually also used to charge the electric power source and power the refrigeration unit.

Conventional TRU (Truck refrigeration unit) are usually diesel engine powered. However, lesser efficiency, higher noise and non-zero emissions associated are the primary driver for exploring new avenues for powering TRUs. In this regard electrified TRUs powered via fuel-cell (FC)-battery hybrid system are a suitable alternative. However, for controlling the degree of hybridization which is defined as FC generated power to the total TRU/load power, an improved energy management strategy/scheme (EMS) is desirable.

One of the major challenges with standalone FC power source is its slow dynamic response time dominated by parasitic loads and operating temperature. As a result, during fast load transients the FC voltage drops sharply which may lead to TRU/system failure/shutdown. Also, frequent FC voltage drops lower the cell voltage and degrades performance.

Therefore, it is desirable to provide a system and a method that may improve power management in a hybrid fuel-cell powered TRU and maximize adoption of the hybrid fuel-cell powered TRUs in the transportation industry.

SUMMARY

This summary is provided to introduce a selection of concepts, in a simplified format, that are further described in the detailed description of the invention. This summary is neither intended to identify key or essential inventive concepts of the invention and nor is it intended for determining the scope of the invention.

A system for managing power supplied to a Transportation Refrigeration Unit (TRU), is disclosed. The system includes a power supply system, at least one electric power converter, and control circuitry coupled to the power supply system. The power supply system, in communication with the TRU, includes at least one battery unit and at least one fuel cell. The at least one battery unit is electrically connected to the TRU to supply power to the TRU. The at least one fuel cell is electrically connected to the TRU and connected in parallel to the at least one battery unit. The at least one electric power converter is electrically connected between the power supply system and the TRU for regulating power supply to the TRU. The control circuitry, coupled to the power supply system and the TRU, is configured to receive information associated with an operational characteristic of at least one subcomponent of the TRU. Next, the control circuitry is configured to predict an increase or a decrease in a load associated with the at least one subcomponent of the TRU based on the received information. Finally, the control circuitry is configured to broadcast a control signal to the at least one fuel cell at a predefined time duration before the predicted increase or decrease in the load, wherein the control signal regulates the power supply from the at least one fuel cell to the at least one subcomponent.

In one or more embodiments, the at least one subcomponent of the TRU includes at least one of a compressor, an evaporator, and a condenser.

In one or more embodiments, at least one of an air moving device and an electrical drive motor is operatively coupled to the at least one subcomponent of the TRU.

In one or more embodiments, the operational characteristic comprises a rotational speed, an operational state, and a load current associated with one or more of the at least one subcomponent, the air moving device, and the electrical drive motor.

In one or more embodiments, predicting the increase in the load associated with the at least one subcomponent of the TRU includes analysing the received information associated with the operational characteristic of the at least one subcomponent of the TRU and determining an increase in the operational characteristic associated with one or more of the at least one subcomponent, the air moving device, and the electrical drive motor.

In one or more embodiments, if the predicted increase in the load associated with the at least one subcomponent of the TRU is greater than a threshold load, the control circuitry is further configured to broadcast a control signal to the at least one battery unit to supply supplemental power to the at least one subcomponent of the TRU.

In one or more embodiments, predicting the decrease in the load associated with the at least one subcomponent of the TRU includes analysing the received information associated with the operational characteristic of the at least one subcomponent of the TRU and determining a decrease in the operational characteristic associated with one or more of the at least one subcomponent, the air moving device, and the electrical drive motor.

In one or more embodiments, the predefined time duration is set based on one or more parameters of the at least one fuel cell.

A method for managing power supplied to a Transportation Refrigeration Unit (TRU), is also disclosed. The method includes providing a power supply system in communication with the TRU. The power supply system includes at least one battery unit and at least one fuel cell. Next, control circuitry coupled to the power supply system, receives information associated with an operational characteristic of at least one subcomponent of the TRU. Then, the control circuitry predicts an increase or a decrease in a load associated with the at least one subcomponent of the TRU based on the received information. Consequently, the control circuitry broadcasts a control signal to at least one fuel cell at a predefined time duration before the predicted increase or decrease in the load, such that the control signal regulates the power supply from the at least one fuel cell to the at least one subcomponent of the TRU.

In one or more embodiments, in the power supply system, the at least one battery unit is electrically connected to the TRU to supply power to the TRU and the at least one fuel cell is electrically connected to the TRU and connected in parallel to the at least one battery unit.

In one or more embodiments, the at least one subcomponent of the TRU includes at least one of a compressor, an evaporator, and a condenser.

In one or more embodiments, at least one of an air moving device and an electrical drive motor is operatively coupled to the at least one subcomponent of the TRU.

In one or more embodiments, the operational characteristic includes a rotational speed, an operational state, and a load current associated with one or more of the at least one subcomponent, the air moving device, and the electrical drive motor.

In one or more embodiments, predicting the increase in the load associated with the at least one subcomponent of the TRU includes analysing the received information associated with the operational characteristic of the at least one subcomponent of the TRU and determining an increase in the operational characteristic associated with one or more of the at least one subcomponent, the air moving device, and the electrical drive motor.

In one or more embodiments, if the predicted increase in the load associated with the at least one subcomponent of the TRU is greater than a threshold load, the control circuitry is further configured to broadcast a control signal to the at least one battery unit to supply supplemental power to the at least one subcomponent of the TRU.

In one or more embodiments, predicting the decrease in the load associated with the at least one subcomponent of the TRU includes analysing the received information associated with the operational characteristic of the at least one subcomponent of the TRU and determining a decrease in the operational characteristic associated with one or more of the at least one subcomponent, the air moving device, and the electrical drive motor.

In one or more embodiments, the predefined time duration is set based on one or more parameters of the at least one fuel cell.

To further clarify the advantages and features of the methods, systems, and apparatuses/devices, a more particular description of the methods, systems, and apparatuses/devices will be rendered by reference to specific embodiments thereof, which are illustrated in the appended drawings. It is appreciated that these drawings depict only typical embodiments of the disclosure and are therefore not to be considered limiting of its scope. The disclosure will be described and explained with additional specificity and detail with the accompanying drawings.

BRIEF DESCRIPTION OF THE DRAWINGS

These and other features, aspects, and advantages of the invention will become better understood when the following detailed description is read with reference to the accompanying drawings in which like characters represent like parts throughout the drawings, wherein.

Figure 1:
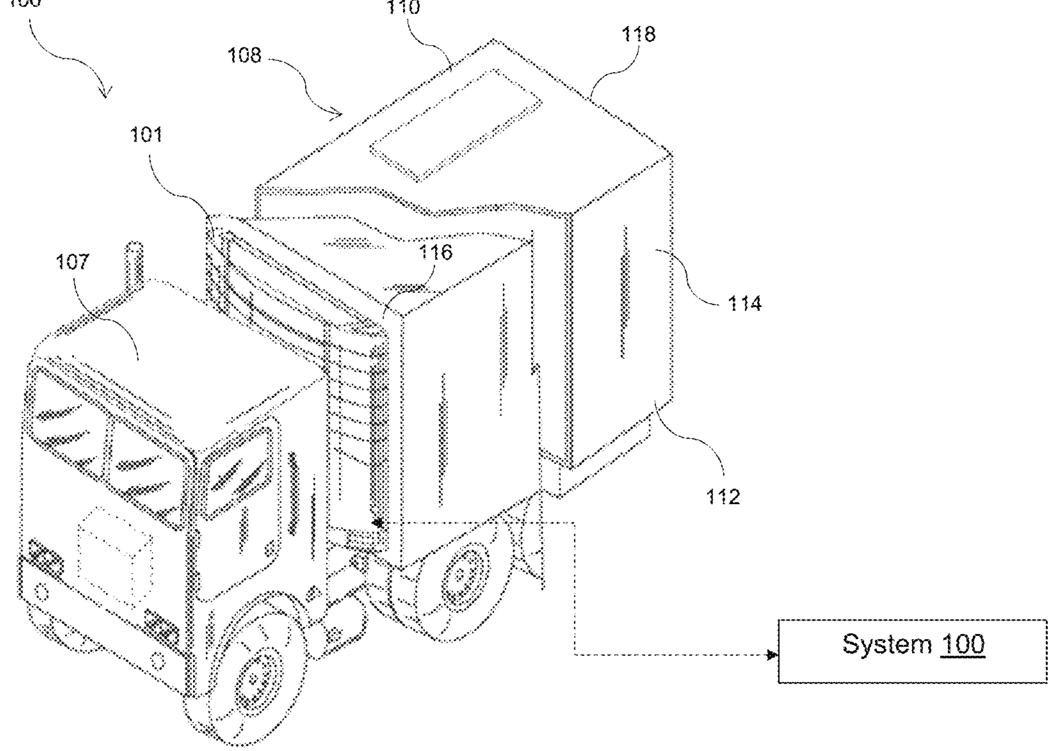
FIG. 1 illustrates a perspective view of a vehicle having a Transport Refrigeration Unit (TRU), according to one or more embodiments of the disclosure.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having the benefit of the description herein.

DETAILED DESCRIPTION OF FIGURES

For the purpose of promoting an understanding of the principles of the disclosure, reference will now be made to the various embodiments and specific language will be used to describe the same. It will nevertheless be understood that no limitation of the scope of the disclosure is thereby intended, such alterations and further modifications in the illustrated system and device, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment", "some embodiments", "one or more embodiments" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

The term "unit" used herein may imply a unit including, for example, one of hardware, software, and firmware or a combination of two or more of them. The "unit" may be interchangeably used with a term such as logic, a logical block, a component, a circuit, and the like. The "unit" may be a minimum system component for performing one or more functions or may be a part thereof.

Embodiments of the disclosure will be described below in detail with reference to the accompanying drawings.

Conventionally, vehicles with a Transport Refrigeration Unit (TRU) 101, are usually diesel engine powered. However, less efficiency, higher noise, and non-zero emissions associated are the primary drivers for exploring new avenues for powering TRUs 101. In this regard, electrified TRUs 101 powered using fuel-cell (FC)-battery hybrid systems are a better alternative. However, for controlling the degree of hybridization which is defined as the fuel-cell generated power to the total TRU/load power, an optimized power management strategy (PMS) is desired. The disclosure provides a system and a method for managing power supplied to the TRU 101 of a vehicle 106. The system 100, disclosed herein, for managing power supplied to the TRU 101 proposes an improved power management strategy that predicts the load of the TRU 101 and accordingly controls the power supplied to the TRU 101 thereby ensuring optimal energy distribution for the fuel-cell and a battery. Moreover, the proposed power management strategy ensures the battery serves as a power assist to the fuel-cell.

Figure 2A:
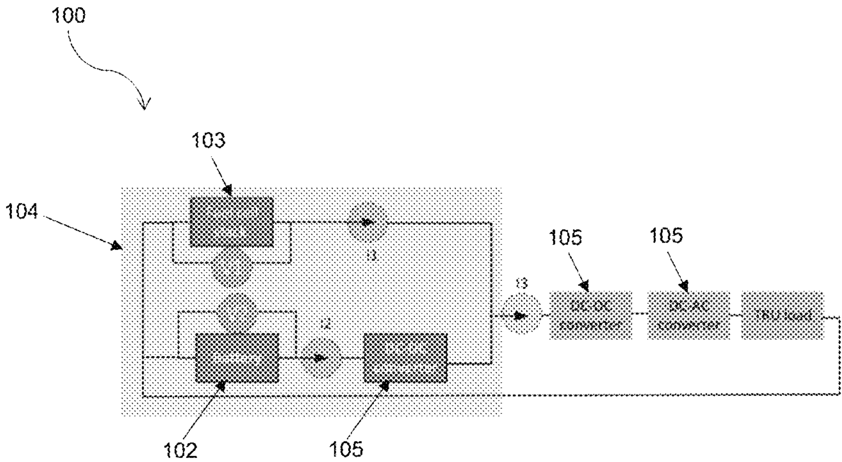
FIG. 2A illustrates a block diagram of a system deployed in the vehicle, according to one or more embodiments of the disclosure.
Figure 2B:
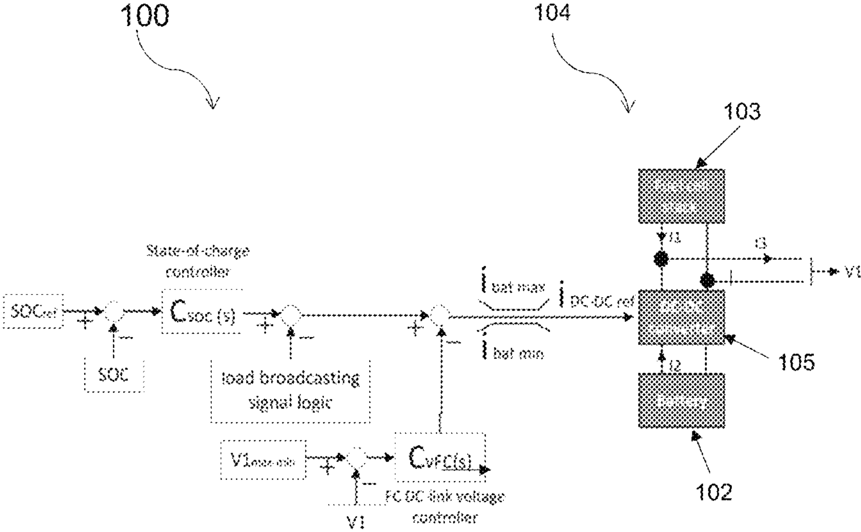
FIG. 2B illustrates a block diagram of the system deployed in the vehicle, according to one or more embodiments of the disclosure.

One of the major challenges with standalone fuel-cell power source is slow dynamic response time dominated by parasitic loads and operating temperature. As a result, during fast load transients the fuel-cell voltage drops sharply which may lead to the failure or shutdown of the TRU 101. Also, frequent fuel-cell voltage drops lower the cell voltage and degrades the performance of the fuel-cell. Thus, for utilizing fuel-cell in applications where load dynamically changes, an auxiliary power source (such as battery) is added along with the fuel-cell. For the active fuel-cell and battery hybrid configuration, the fuel-cell serves as primary source of energy and the battery serves as an auxiliary power source supporting the fuel-cell during upwards and downwards load transients. The proposed control architecture of the power management strategy is shown in FIGS. 2A-2B.

FIG. 1 illustrates a perspective view of the vehicle 106 having the Transport Refrigeration Unit (TRU) 101, according to one or more embodiments of the disclosure. In one embodiment, the vehicle 106 may be embodied as a fuel-cell based vehicle which may be part of a powertrain or a drive system of such vehicle. In another embodiment, the vehicle 106 may be embodied as an electric vehicle having electric motors to provide propulsive force for traversing such vehicle. In yet another embodiment, the vehicle 106 may be embodied as a hybrid vehicle having a combination of a fuel-cell and one or more electric motors.

Referring to FIG. 1, the vehicle 106 may include an operator's cabin 107, a container 108, the TRU 101, and the system 100. The operator's cabin 107 may be located at a front of the vehicle 106 and coupled to the container 108. In an embodiment, the container 108 may be pulled by the vehicle 106. It is understood that embodiments described herein may be applied to shipping containers that are shipped by rail, sea, air, or any other suitable container, thus the vehicle 106 may be a truck, train, boat, airplane, helicopter, etc. The container 108 may be coupled to the vehicle 106 and is thus pulled or propelled to desired destinations.

In an embodiment, the container 108 may include a top wall 110, a bottom wall 112 opposed to and spaced from the top wall 110, a pair of side walls 114 spaced from and opposed to one another, and front and rear walls 116, 118 spaced from and opposed to one another. The front wall 116 may be closest to the vehicle 106. The container 108 may further include doors (not shown) at the rear wall 118, or any other wall. The walls 110, 112, 114, 116, 118 may together define the boundaries of a cargo compartment within the container 108.

The vehicle 106 may be used to transport and distribute cargo, such as perishable goods and environmentally sensitive goods, herein referred to as perishable goods. The perishable goods may include, but are not limited to, fruits, vegetables, grains, beans, nuts, eggs, dairy, seed, flowers, meat, poultry, fish, ice, blood, pharmaceuticals, and any other suitable cargo requiring cold chain transport.

In the illustrated embodiment, the TRU 101 may be coupled to the container 108 and positioned on the front wall 116 of the container 108. The TRU 101 may be adapted to provide desired environmental parameters, such as temperature, pressure, humidity, carbon dioxide, ethylene, ozone, light exposure, vibration exposure, and other conditions to the cargo compartment of the container 108. In one or more embodiments, the TRU 101 may be embodied as a refrigeration system capable of providing a desired temperature range and a humidity range.

In an embodiment, the TRU 101 may include, but is not limited to, a compressor, an electric compressor motor, a condenser that may be air cooled, a condenser fan assembly, a receiver, a filter dryer, a heat exchanger, an expansion valve, an evaporator, an evaporator fan assembly, a suction modulation valve, and controller that may include a computer-based processor (e.g., microprocessor). Referring to FIG. 1, the TRU 101 may be in communication with the system 100 of the vehicle 106. The system 100 may be configured to supply power for operating the TRU 101 or at least the subcomponents of the TRU 101.

FIG. 2A illustrates a block diagram of the system 100 deployed in the vehicle 106, according to one or more embodiments of the disclosure. FIG. 2B illustrates a block diagram of the system 100 deployed in the vehicle 106, according to one or more embodiments of the disclosure.

The system 100, disclosed herein, includes a power supply system 104 in communication with the TRU 101, at least one electric power converter 105, and control circuitry coupled to the power supply system 104. In an embodiment, the power supply system 104 includes at least one battery unit 102 and at least one fuel cell 103. The at least one battery unit 102 is electrically connected to the TRU 101 to supply power to the TRU 101. Moreover, the at least one fuel cell 103 is electrically connected to the TRU 101 and connected in parallel to the at least one battery unit 102. The at least one electric power converter 105 is electrically connected between the power supply system 104 and the TRU 101 for regulating power supply to the TRU 101. In an embodiment, the at least one electric power converter 105 may be a DC-DC boost converter or a DC-AC converter. The DC/DC boost converter may be configured to regulate the output voltage of the at least one battery unit 102 and/or the at least one fuel cell 103. For instance, the DC/DC boost converter may increase the output voltage of the at least one battery unit 102 and/or the at least one fuel cell 103.

In an embodiment, the control circuitry is coupled to the power supply system 104 and the TRU 101. The control circuitry is configured to receive information associated with an operational characteristic of at least one subcomponent of the TRU 101. The at least one subcomponent of the TRU 101 may include, but is not limited to, at least one of a compressor, an evaporator, and a condenser. In an embodiment, at least one of an air moving device, for example, a fan, etc., and an electrical drive motor is operatively coupled to the at least one subcomponent of the TRU 101. As used herein, the term "operational characteristic" may be construed to refer to at least one of a rotational speed, an operational state, and a load current associated with one or more of the at least one subcomponent, the air moving device, and the electrical drive motor. In one or more embodiments, the control circuitry may be a stand-alone unit or integral with the TRU 101, without departing from the scope of the disclosure. The control circuitry may be configured to receive various inputs indicative of an operational state of the TRU 101 and determine a power requirement for the TRU 101. Based on the power requirements, the control circuitry may be configured to direct the power supply from the at least one fuel cell 103 to the TRU 101. In one or more embodiments, the control circuitry may be in communication with a plurality of sensors, such as fan speed sensors, temperature sensors, voltage sensors, and current sensors of the TRU 101 and, may be configured to estimate the power requirement of the TRU 101 based on the inputs received from the plurality of sensors of the TRU 101.

Next, the control circuitry is configured to predict an increase or a decrease in a load associated with the at least one subcomponent of the TRU 101 based on the received information. For example, the step of prediction is performed using information gathered from one or more relays attached to switches associated with the at least one subcomponent. The relays provide the information regarding which of the at least one subcomponent is turned ON. Moreover, depending on the retrieved relay information the control circuitry accesses a look up table to predict the required power or load for which the system 100 needs to be prepared. In an embodiment, the step of predicting the increase in the load associated with the at least one subcomponent of the TRU 101 includes analysing the received information associated with the operational characteristic of the at least one subcomponent of the TRU 101 followed by determining an increase in the operational characteristic associated with one or more of the at least one subcomponent, the air moving device, and the electrical drive motor. If the predicted increase in the load associated with the at least one subcomponent of the TRU 101 is greater than a threshold load, the control circuitry is further configured to broadcast a control signal to the at least one battery unit 102 to supply supplemental power to the at least one subcomponent of the TRU 101.

Alternatively, the control circuitry predicts the decrease in the load associated with the at least one subcomponent of the TRU 101 by analysing the received information associated with the operational characteristic of the at least one subcomponent of the TRU 101 followed by determining a decrease in the operational characteristic associated with one or more of the at least one subcomponent, the air moving device, and the electrical drive motor.

Finally, the control circuitry broadcasts a control signal to the at least one fuel cell 103 at a predefined time duration before the predicted increase or decrease in the load, wherein the control signal regulates the power supply from the at least one fuel cell 103 to the at least one subcomponent. In an embodiment, the predefined time duration is set based on one or more parameters of the at least one fuel cell 103. As used herein, the "one or more parameters" of the at least one fuel cell 103 that decide the predefined time duration include the compressor time constant and the maximum ramp up rate supported by the at least one fuel cell 103. The compressor time constant refers to the time lag associated with the compressor. The maximum ramp up rate refers to the maximum Ampere/seconds at which the at least one fuel cell 103 supports the ramping up of the power.

In one or more embodiments, the communication between various components, such as the control circuitry, the sensors, the TRU 101, the at least one battery unit 102, and the at least one fuel cell 103 may be embodied as wireless communication or wired communication. In an embodiment, the sensors communicate with the control circuitry via an in-vehicle network. The in-vehicle network may include, but is not limited to, for example, a controller area network (CAN), a Bluetooth Low Energy (BLE) network, a vehicle area network (VAN), Domestic Digital Bus (D2B), Time-Triggered Protocol (TTP), Flex Ray, IEEE 1394, Carrier Sense Multiple Access With Collision Detection (CSMA/CD) based data communication protocol, Inter-integrated Circuit (I2C), Inter Equipment Bus (IEBus), Society of Automotive Engineers, (SAE) J1708, SAE J1939, International Organization for Standardization (ISO) 11992, ISO 11783, Power-line communication (PLC), Plastic Optic Fiber (POF), Serial Peripheral Interface (SPI) bus, Local Interconnect Network (LIN), etc.

As used herein, the term "control circuitry" may refer to one or a combination of microprocessors, suitable logic, circuits, audio interfaces, visual interfaces, haptic interfaces, or the like. The control circuitry may include, but are not limited to a microcontroller, a Reduced Instruction Set Computing (RISC) processor, an Application-Specific Integrated Circuit (ASIC) processor, a Complex Instruction Set Computing (CISC) processor, a central processing unit (CPU), a graphics processing unit (GPU), a state machine, and/or other processing units or circuits. In one or more embodiments, the control circuitry may include a processor, memory, modules, and data. The modules and the memory are coupled to the processor. The processor can be a single processing unit or several units, all of which could include multiple computing units. The processor may be implemented as one or more microprocessors, microcomputers, microcontrollers, digital signal processors, central processing units, state machines, logic circuitries, and/or any devices that manipulate signals based on operational instructions. Among other capabilities, the processor is configured to fetch and execute computer-readable instructions and data stored in the memory.

The control circuitry may also comprise suitable logic, circuits, interfaces, and/or code that may be configured to execute a set of instructions stored in the memory. The memory may additionally store various types of information related to the vehicle or preferences of the passengers, for example, a set of predefined limiting parameters for the one or more components, driver behavior, location information, vehicle registration information, historical data related to passenger preferences and driver behavior, etc. In an exemplary implementation of the memory unit according to the present disclosure, the memory unit may include, but are not limited to, Electrically Erasable Programmable Read-only Memory (EEPROM), Random Access Memory (RAM), Read Only Memory (ROM), Hard Disk Drive (HDD), Flash memory, Solid-State Drive (SSD), and/or CPU cache memory. The memory may also include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The modules, amongst other things, include routines, programs, objects, components, data structures, etc., which perform tasks or implement data types. The modules may also be implemented as, signal processor(s), state machine (s), logic circuitries, and/or any other device or component that manipulate signals based on operational instructions. Further, the modules can be implemented in hardware, instructions executed by a processing unit, or by a combination thereof. The processing unit can comprise a computer, a processor, such as the processor, a state machine, a logic array, or any other suitable devices capable of processing instructions. The processing unit can be a general-purpose processor which executes instructions to cause the general-purpose processor to perform the required tasks or, the processing unit can be dedicated to performing the required functions. In another aspect of the present disclosure, the modules may be machine-readable instructions (software) which, when executed by a processor/processing unit, perform any of the described functionalities.

Figure 3:
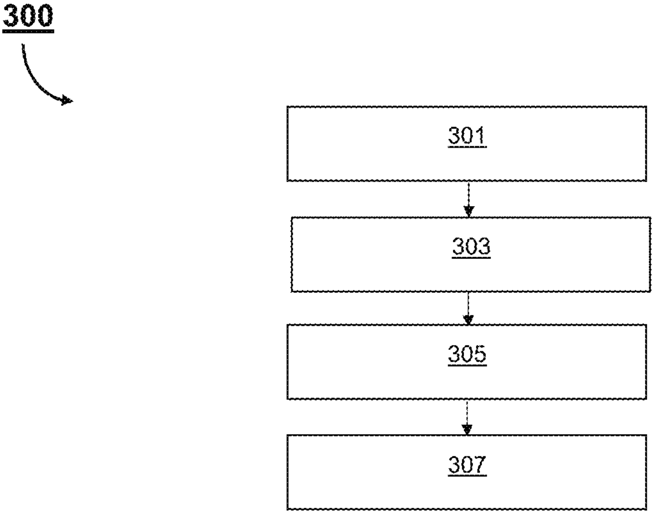
FIG. 3 illustrates a flowchart depicting a method for managing power supplied to the TRU, according to one or more embodiments of the disclosure.

FIG. 3 illustrates a flowchart depicting a method 300 for managing power supplied to the TRU 101, according to one or more embodiments of the disclosure.

At Step 301, the power supply system 104 in communication with the TRU 101 is provided. The power supply system 104 includes at least one battery unit 102 and at least one fuel cell 103. In one or more embodiments, the at least one battery unit 102 is electrically connected to the TRU 101 to supply power to the TRU 101 and the at least one fuel cell 103 is electrically connected to the TRU 101 and connected in parallel to the at least one battery unit 102.

At Step 303, the control circuitry coupled to the power supply system 104 receives information associated with an operational characteristic of the at least one subcomponent of the TRU 101. In an embodiment, the at least one subcomponent of the TRU 101 comprises at least one of a compressor, an evaporator, and a condenser. Moreover, at least one of the air moving device and the electrical drive motor is operatively coupled to the at least one subcomponent of the TRU 101. The operational characteristic may include a rotational speed, an operational state, and a load current associated with one or more of the at least one subcomponent, the air moving device, and the electrical drive motor.

At Step 305, the control circuitry predicts an increase or a decrease in the load associated with the at least one subcomponent of the TRU 101 based on the received information. In an embodiment, predicting the increase in the load associated with the at least one subcomponent of the TRU 101 includes analysing the received information associated with the operational characteristic of the at least one subcomponent of the TRU 101 and determining an increase in the operational characteristic associated with one or more of the at least one subcomponent, the air moving device, and the electrical drive motor. Alternatively, predicting the decrease in the load associated with the at least one subcomponent of the TRU 101 includes analysing the received information associated with the operational characteristic of the at least one subcomponent of the TRU 101 and determining a decrease in the operational characteristic associated with one or more of the at least one subcomponent, the air moving device, and the electrical drive motor.

At Step 307, the control circuitry broadcasts a control signal to the at least one fuel cell 103 at a predefined time duration before the predicted increase or decrease in the load, wherein the control signal regulates the power supply from the at least one fuel cell 103 to the at least one subcomponent of the TRU 101. If the predicted increase in the load associated with the at least one subcomponent of the TRU 101 is greater than a threshold load, the control circuitry is further configured to broadcast a control signal to the at least one battery unit 102 to supply supplemental power to the at least one subcomponent of the TRU 101. In an embodiment, the predefined time duration is set based on one or more parameters of the at least one fuel cell 103.

While the above steps of FIG. 3 are shown and described in a particular sequence, the steps may occur in variations to the sequence in accordance with various embodiments of the disclosure. Further, the details related to various steps of FIG. 3, which are already covered in the description related to FIGS. 1-2B are not discussed again in detail here for the sake of brevity. As would be gathered, the disclosure offers the system 100 and the method 300 for managing power supplied to the TRU 101 of the vehicle 106. Advantageously, the system 100 and method 300 according to the present disclosure provide an improved energy management by predicting a change from the steady state operation of the TRU 101 and dynamically adjusting energy supply before the instantaneous load or absence of load occurs. Moreover, for higher power load transients, the at least one battery unit 102 serves as the auxiliary or additional power source to supplement the power supplied from the at least one fuel cell 103. Finally, the system 100 ensures minimal or optimal sizing of the battery for the hybrid power system thereby keeping the size of the at least one battery unit 102 small.

While specific language has been used to describe the subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

We claim:

1. A system for managing power supplied to a Transportation Refrigeration Unit (TRU), the system comprising:

a power supply system in communication with the TRU, the power supply system comprising:

at least one battery unit electrically connected to the TRU to supply power to the TRU; and at least one fuel cell electrically connected to the TRU and connected in parallel to the at least one battery unit;

at least one electric power converter electrically connected between the power supply system and the TRU for regulating power supply to the TRU; and control circuitry coupled to the power supply system and the TRU, the control circuitry configured to:

receive information associated with an operational characteristic of at least one subcomponent of the TRU;

predict an increase or a decrease in a load associated with the at least one subcomponent of the TRU based on the received information;

broadcast a control signal to the at least one fuel cell at a predefined time duration before the predicted increase or decrease in the load, wherein the control signal regulates the power supply from the at least one fuel cell to the at least one subcomponent, wherein responsive to the predicted increase in the load associated with the at least one subcomponent of the TRU is greater than a threshold load, the control circuitry is configured to broadcast a control signal to the at least one battery unit to supply supplemental power to the at least one subcomponent of the TRU.

2. The system according to claim 1, wherein the at least one subcomponent of the TRU comprises at least one of a compressor, an evaporator, and a condenser.

3. The system according to claim 2, wherein at least one of an air moving device and an electrical drive motor is operatively coupled to the at least one subcomponent of the TRU.

4. The system according to claim 1, wherein the operational characteristic comprises a rotational speed, an operational state, and a load current associated with one or more of the at least one subcomponent, the air moving device, and the electrical drive motor.

5. The system according to claim 1, wherein predicting the increase in the load associated with the at least one subcomponent of the TRU comprises:

analysing the received information associated with the operational characteristic of the at least one subcomponent of the TRU; and determining an increase in the operational characteristic associated with one or more of the at least one subcomponent, the air moving device, and the electrical drive motor.

6. The system according to claim 1, wherein predicting the decrease in the load associated with the at least one subcomponent of the TRU comprises:

analysing the received information associated with the operational characteristic of the at least one subcomponent of the TRU; and determining a decrease in the operational characteristic associated with one or more of the at least one subcomponent, the air moving device, and the electrical drive motor.

7. The system according to claim 1, wherein the predefined time duration is set based on one or more parameters of the at least one fuel cell.

8. A method for managing power supplied to a Transportation Refrigeration Unit (TRU), the method comprising:

providing a power supply system in communication with the TRU, the power supply system comprising at least one battery unit and at least one fuel cell;

receiving, via control circuitry coupled to the power supply system, information associated with an operational characteristic of at least one subcomponent of the TRU;

predicting, via the control circuitry, an increase or a decrease in a load associated with the at least one subcomponent of the TRU based on the received information; and broadcasting, via the control circuitry, a control signal to at least one fuel cell at a predefined time duration before the predicted increase or decrease in the load, wherein the control signal regulates the power supply from the at least one fuel cell to the at least one subcomponent of the TRU, wherein responsive to the predicted increase in the load associated with the at least one subcomponent of the TRU is greater than a threshold load, the control circuitry is configured to broadcast a control signal to the at least one battery unit to supply supplemental power to the at least one subcomponent of the TRU.

9. The method according to claim 8, wherein, in the power supply system, the at least one battery unit is electrically connected to the TRU to supply power to the TRU, and the at least one fuel cell is electrically connected to the TRU and connected in parallel to the at least one battery unit.

10. The method according to claim 8, wherein the at least one subcomponent of the TRU comprises at least one of a compressor, an evaporator, and a condenser.

11. The method according to claim 10, wherein at least one of an air moving device and an electrical drive motor is operatively coupled to the at least one subcomponent of the TRU.

12. The method according to claim 8, wherein the operational characteristic comprises a rotational speed, an operational state, and a load current associated with one or more of the at least one subcomponent, the air moving device, and the electrical drive motor.

13. The method according to claim 8, wherein predicting the increase in the load associated with the at least one subcomponent of the TRU comprises:

analysing the received information associated with the operational characteristic of the at least one subcomponent of the TRU; and determining an increase in the operational characteristic associated with one or more of the at least one subcomponent, the air moving device, and the electrical drive motor.

14. The method according to claim 8, wherein predicting the decrease in the load associated with the at least one subcomponent of the TRU comprises:

analysing the received information associated with the operational characteristic of the at least one subcomponent of the TRU; and determining a decrease in the operational characteristic associated with one or more of the at least one subcomponent, the air moving device, and the electrical drive motor.

15. The method according to claim 8, wherein the predefined time duration is set based on one or more parameters of the at least one fuel cell.

16. A system for managing power supplied to a Transportation Refrigeration Unit (TRU), the system comprising:

a power supply system in communication with the TRU, the power supply system comprising:

at least one battery unit electrically connected to the TRU to supply power to the TRU; and at least one fuel cell electrically connected to the TRU and connected in parallel to the at least one battery unit;

at least one electric power converter electrically connected between the power supply system and the TRU for regulating power supply to the TRU; and control circuitry coupled to the power supply system and the TRU, the control circuitry configured to:

receive information associated with an operational characteristic of at least one subcomponent of the TRU;

predict an increase or a decrease in a load associated with the at least one subcomponent of the TRU based on the received information;

broadcast a control signal to the at least one fuel cell at a predefined time duration before the predicted increase or decrease in the load, wherein the control signal regulates the power supply from the at least one fuel cell to the at least one subcomponent, wherein predicting the decrease in the load associated with the at least one subcomponent of the TRU comprises:

analysing the received information associated with the operational characteristic of the at least one subcomponent of the TRU; and determining a decrease in the operational characteristic associated with one or more of the at least one sub-component, the air moving device, and the electrical drive motor.

* * * * *